(No Model.) 3 Sheets—Sheet 1.
E. R. PUFFER.
SCALE.

No. 298,118. Patented May 6, 1884.

Witnesses:
Chas. E. Gaylord.
Edward W. Caffrey

Inventor:
Edwin R. Puffer,
by P. C. Dyrenforth,
Attorney.

(No Model.)  3 Sheets—Sheet 2.

E. R. PUFFER.
SCALE.

No. 298,118. Patented May 6, 1884.

Fig. 2.

Witnesses:
Chas. E. Gaylord.
Edward W. Caffrey.

Inventor:
Edwin R. Puffer,
by R. C. Dyrenforth,
Attorney.

(No Model.) 3 Sheets—Sheet 3.

E. R. PUFFER.
SCALE.

No. 298,118. Patented May 6, 1884.

Witnesses:
Chas. E. Gaylord.
Edward McCaffrey

Inventor:
Edwin R. Puffer,
by R. C. Dyrenforth,
Attorney.

UNITED STATES PATENT OFFICE.

EDWIN R. PUFFER, OF RIVERSIDE, ILLINOIS.

SCALE.

SPECIFICATION forming part of Letters Patent No. 298,118, dated May 6, 1884.

Application filed July 5, 1883. (No model.)

*To all whom it may concern:*

Be it known that I, EDWIN R. PUFFER, a citizen of the United States, residing at Riverside, in the county of Cook and State of Illinois, have invented certain new and useful Improvements in Scales; and I hereby declare the following to be a full, clear, and exact description of the same.

My invention relates, primarily, to an attachment for platform-scales designed for weighing heavy weights, and it is especially useful in the weighing of moving bodies, such as cars; and my object is to provide an indicator which shall serve as a substitute for the weights commonly employed with such platform-scales, and upon which the weight may be determined at a glance without any of the delay or difficulty incident to the use of weights. Many of the features of my invention, however, will be found valuable in scales of other descriptions, and not as a mere indicator, but as the scale itself.

The principles involved herein may be successfully applied in scales designed for very fine weighing. Indeed, one of the principal objects of my invention is to combine the greatest accuracy with the greatest commensurate simplicity of construction and operation. It will be manifest, therefore, that the same principle herein described may apply to scales for weighing such heavy objects as cars and the like, and also in such delicate devices as druggists' scales, &c.

My invention consists in attaching to the scale-beam of a platform-scale a helical spring having its resistance regulated to measure the weights upon the said platform-scale and acting, through intermediate mechanism, upon a vibrating index-finger made in two parts, one part sliding longitudinally upon the other, causing it to lengthen and shorten in its vibrations, and thus follow the line of the spiral formed upon a dial-plate, and having a graduated scale of numbers marked upon it; and my invention consists, still further, in certain details of construction and combinations of parts, all as hereinafter more fully set forth.

Figure 1:
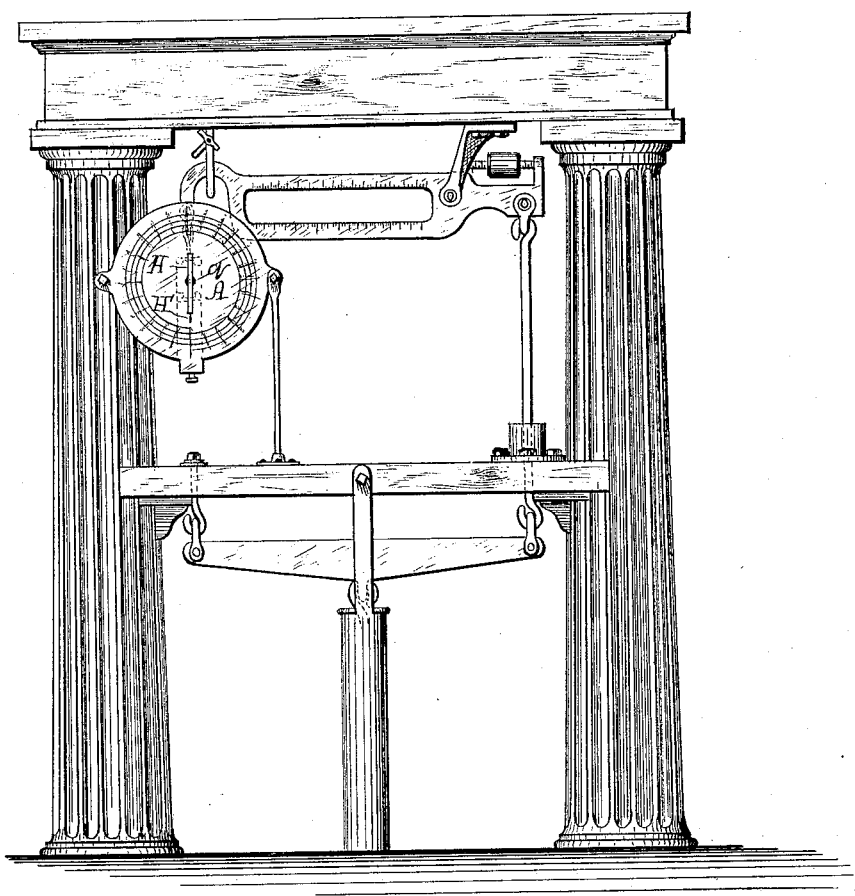
Figure 3:
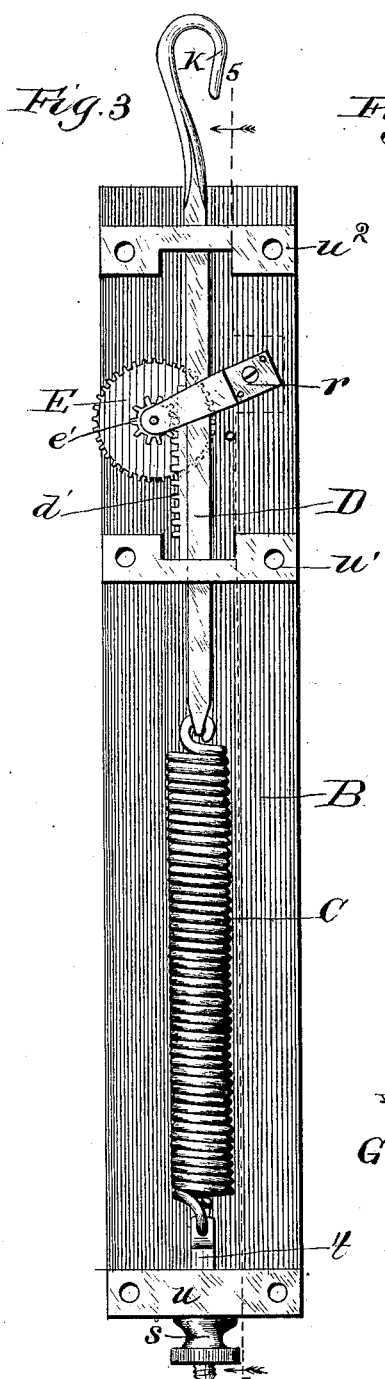
Figure 4:
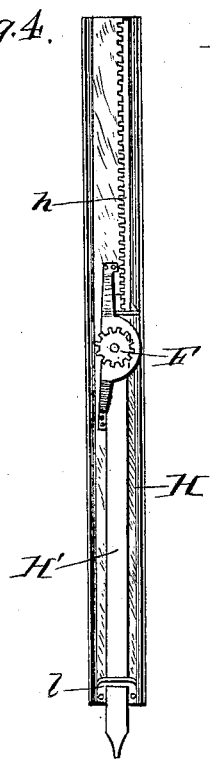
Figure 5:
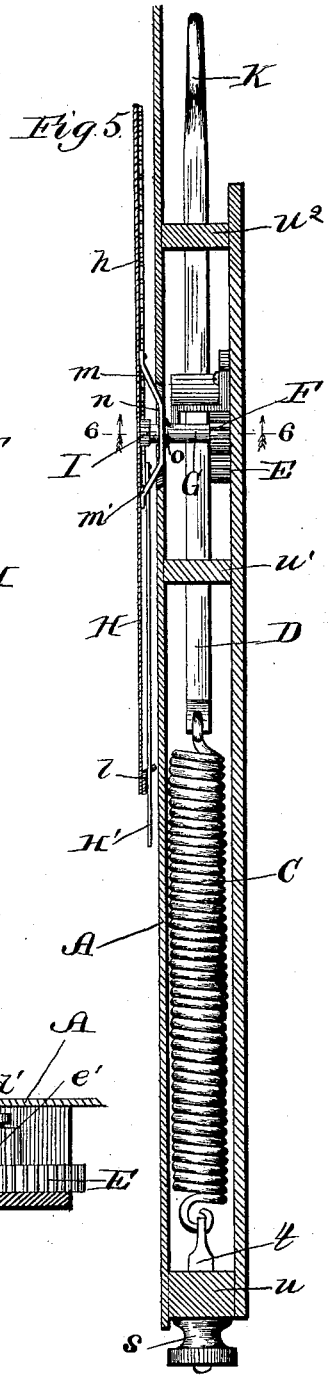
Figure 6:
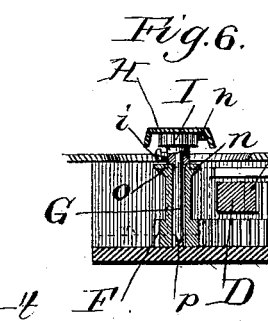

In the drawings, Figure 1 represents a platform-scale with my auxiliary scale attached. Fig. 2 is a front view of my device, showing the graduated dial-plate, with the index-finger pointing at zero; Fig. 3, a rear view of the mechanism attached to the back of the dial-plate, by means of which the index-finger is caused to vibrate; Fig. 4, a rear view of the extensible index-finger and attachments; Fig. 5, a vertical section taken on the line 5 5 of Fig. 3, and Fig. 6 a transverse section taken on the line 6 6 of Fig. 5.

A is the dial-plate, having marked thereon a spiral, in which the spaces are equally distant apart. The dial-plate A is provided with a projection, $v$, extending downward from its periphery.

B is an oblong plate, provided on its inner surface with transverse bars $u$, $u'$, and $u^2$, in which are formed, near their extremities, screw-holes to permit the said bars to be secured by means of screws to the back of the dial-plate, which is provided with holes coincident with those in the said transverse bars. The bar $u$ is provided with an opening near its center, to form a guide for the rod $t$, to which one end of the helical spring C is attached. The projecting end of the rod $t$ is screw-threaded to accommodate the nut $s$, correspondingly screw-threaded on its interior surface, whereby the tension of the spring is regulated. The helical spring C lies along the oblong plate B and extends from the projection $v$ toward the center of the dial-plate, where it is attached to the rod D. This rod D is supported within guides formed in the transverse bars $u'$ and $u^2$; and the said rod D is provided with a rack, $d'$, formed on one of its sides, to mesh with the pinion $e'$ of the wheel E. The wheel E meshes with the pinion F on the arbor G. The plate B affords bearings for one end of the shaft of the wheel E and for one end of the arbor G, while the other end of the shaft of the wheel E has its bearing in a Z-shaped support, $r$, secured at one end to the inner face of the plate B. The transverse bars $u$, $u'$, and $u^2$, besides providing guides for the rod $t$ and the rod D, afford a space between plate B and the dial-plate, in which to permit the mechanism above described to operate. The resistance of the helical spring C is so regulated by means of the nut $s$ that the index-finger will point to the largest number indicating the weight on the dial-plate, when the bar D is pulled out so far that the last tooth of the rack $d'$, formed thereon, is brought into mesh with the pinion $e'$. The wheel E is arranged to make one complete revolution during this operation, whereby the pinion F, having one-fourth the number of leaves that the wheel E has teeth, will revolve four times, causing the index-finger to make a like number of revolutions.

The greatest weight indicated on the dial-plate shown in the drawings is eighty thousand pounds; but it is quite obvious that the maximum number could be either greater or smaller, when it would be necessary to arrange the number of teeth in the gear mechanism accordingly.

In the center of the dial-plate A is an opening, $g$, to admit the pivot $p$, which passes through the index-finger H and down through the hollow arbor G, but does not revolve with the said arbor. The arbor G is provided near its extremity with a shoulder, $o$, to form a seat for the ring $n$, having lateral arms $m$ and $m'$, projecting upward and outward, and riveted or otherwise secured to the rear face of the index-finger H. The ring $n$ is firmly secured upon the shoulder $o$ on the arbor G, in order that it may not slip, but will revolve with the arbor and carry with it the index-finger. The spiral on the dial-plate shown in the drawings divides the latter into spaces three-quarters of an inch apart, and the mechanism is so arranged that a weight of twenty thousand pounds is necessary to produce a complete revolution of the index-finger. If, then, there were no means provided for extending the said finger, it might, when pointing at zero, as shown in Fig. 2 of the drawings, indicate either no weight at all or twenty or forty or sixty or eighty thousand pounds, which would render the device comparatively useless and impracticable. To obviate this I have invented an auxiliary index-finger, in the nature of an extension, arranged to operate in connection with the main index-finger, and the following is a description thereof. The index-finger H is formed, preferably, of a flat piece of metal having its lateral edges bent obliquely backward, as shown at $x$ in Fig. 2 of the drawings. On the rear side of the said finger, and working in suitable guides, $l$, formed thereon, is a second finger, H′, made pointed at one extremity, and cut to a narrower strip toward its other extremity, where its inner edge is provided with teeth to form a rack, $h$. I is a pinion formed on the sleeve $k$, which encircles the pivot $p$, and is firmly secured thereto by means of a set-screw, $i$, or other suitable device, to prevent its revolution by friction with the ring $n$ or the teeth of the rack. The pinion I is therefore stationary, and, since the teeth of the rack $h$ are kept in mesh with the leaves of the pinion I, as the index-finger H revolves the finger H′ will be pushed out with each complete revolution of the finger H a distance equal to the circumference of the pinion I, and as such distance should equal the width of space between the spiral, the said pinion I should equal in circumference the distance between the lines forming one of the said spaces.

If, then, the finger points at zero on the dial, one complete revolution thereof will cause it to point at twenty thousand, and so on.

To operate my device in connection with platform-scales, since it is in this connection, as before stated, that it is principally intended to be used, the hook K is attached to the scale-beam where the weights are usually applied, and the dial-plate is rigidly secured to some permanent object, preferably to the uprights supporting the scale-beam, where there are such, all as shown in Fig. 1 of the drawings; or, if not, to some suitable contrivance for that purpose. Openings may be provided at suitable places in the dial-plate itself to admit screws; or, if desired, ears similar to the projection $v$, and having screw-holes, may be provided on the plate, to extend from its periphery.

It is intended, primarily, with my device to provide a long-felt want in the matter of weighing moving objects—such as freight-cars—with accuracy and without difficulty. To effect this the cars are made to pass over the platform of the scale, whereby the weight causes the scale-beam to ascend, thus pulling out the bar D to overcome the resistance of the spring C, and thereby causing the index-finger H to point to the number on the dial-plate corresponding with the weight of the object upon the scale-platform, in the manner hereinbefore described. In this way the weights of the separate cars of a whole train may be taken without the necessity of stopping or even slackening the speed of the train or of adjusting weights.

So far as concerns my device for indicating the weight, comprising the dial-plate having a numbered spiral line upon its face, and an extensible index-finger adapted to follow it, with mechanism for operating the same, it is obvious that this may be employed with advantage in many situations where force or resistance is to be measured, and I therefore do not confine myself to its use in a scale for the measurement of gravity only.

What I claim as new, and desire to secure by Letters Patent, is—

1. In a platform-scale, the combination, with the scale-beam thereof, of a helical spring having its resistance regulated to measure the weights of the said platform-scale, a dial-plate having a graduated scale of numbers arranged on a spiral upon its face, an index-finger vibrating on the dial-plate and made in two parts, one of said parts sliding longitudinally upon the other, and mechanism actuated by the helical spring to cause the index-finger to lengthen and shorten, whereby in its vibrations it is caused to follow the line of the spiral, substantially as described.

2. In a device for measuring force or resistance, an indicator comprising, in combination, a dial-plate provided on its face with a spiral line having numbers at intervals, an index-finger pivoted at the center of the disk and made in two parts, one of said parts sliding longitudinally upon the other, mechanism for vibrating the said finger upon the dial-plate as the force or resistance increases or diminishes, and mechanism for lengthening the said index-finger when moving forward and shortening it when moving backward, whereby it indicates numbers on the several parallels of the spiral line, substantially as described.

3. In a scale, the combination, with the helical spring for counterbalancing the object to be weighed, of a dial-plate provided with a spiral having numbers marked thereon, an index-finger made in two parts, one part sliding upon the other, mechanism operated by the action of the spring, for turning the said index-finger, and mechanism for lengthening the said finger when moving forward and shortening it when moving backward, substantially as described.

4. In a scale, the extensible index-finger H, caused to vibrate over the dial-plate A, having a graduated scale of numbers marked on a spiral formed on its face, said finger comprising a strip of material secured to the mechanism which causes it to vibrate, an auxiliary index-finger, H', secured to the said finger H and pointed at one end and made narrower toward its other end, where it is provided with teeth to form a rack, and the pinion I, rigidly secured to prevent its revolving, and having its circumference equal to the distance between the spaces in the spiral and kept in mesh with the teeth of the said rack, whereby as the index-finger is caused to revolve the auxiliary index-finger H' will have a longitudinal reciprocating motion, substantially as described.

5. In a scale, the combination of the following elements, to wit: a helical spring, C, rod $t$, to which the end of the said spring is secured, nut $s$, screwed upon the end of the rod $t$ and abutting against the transverse bar $u$ on the plate B, said bar having a guide for the said rod $t$, whereby the tension of the spring is regulated, rod D, to which the other end of the helical spring is secured, and which passes through guides formed in suitable transverse bars on the plate B, said rod D having a hook, K, and a rack, $d'$, to mesh with suitable gear, which operates when the said rod acts against or with the resistance of the helical spring, extensible finger H H', connected by means of upward-projecting arms with the gear mechanism, and dial-plate A, having a graduated scale of numbers marked on a spiral formed upon its face, all substantially as described.

EDWIN R. PUFFER.

In presence of—
W. H. DYRENFORTH,
EDWARD MCCAFFREY.